United States Patent

[11] 3,565,226

| [72] | Inventor | Donald M. Winchester<br>11709 Sahara Way, Dallas, Tex. 75218 |
|---|---|---|
| [21] | Appl. No. | 810,390 |
| [22] | Filed | Apr. 15, 1968<br>Division of Ser. No. 520,615, Jan. 14, 1966, abandoned. |
| [45] | Patented | Feb. 23, 1971 |

[54] SPIRAL CHUTE
2 Claims, 7 Drawing Figs.

[52] U.S. Cl. .................................................. 193/12
[51] Int. Cl. ................................................ B65g 11/06
[50] Field of Search .......................................... 193/12, 13

[56] References Cited
UNITED STATES PATENTS

| 840,354 | 1/1907 | Lyle .............................. | 193/12 |
| 1,497,301 | 6/1924 | Pardee ........................ | 193/12 |

FOREIGN PATENTS

| 10,018 | 4/1914 | Great Britain ................ | 193/12 |

*Primary Examiner*—Andres H. Nielsen
*Attorney*—George Galerstein

ABSTRACT: A chute having a central support, an inner wall attached to said central support in helical relation therewith a slide attaches along the outer edge of said inner wall, and an outer wall attached along the outer edge of the slide. The angles formed between the inner wall and the slide and the outer wall are at least 90°.

PATENTED FEB 23 1971
3,565,226
SHEET 2 OF 3
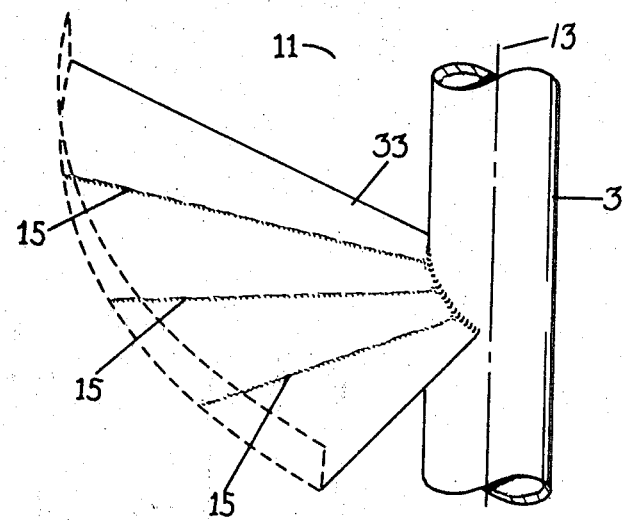
FIG. 2
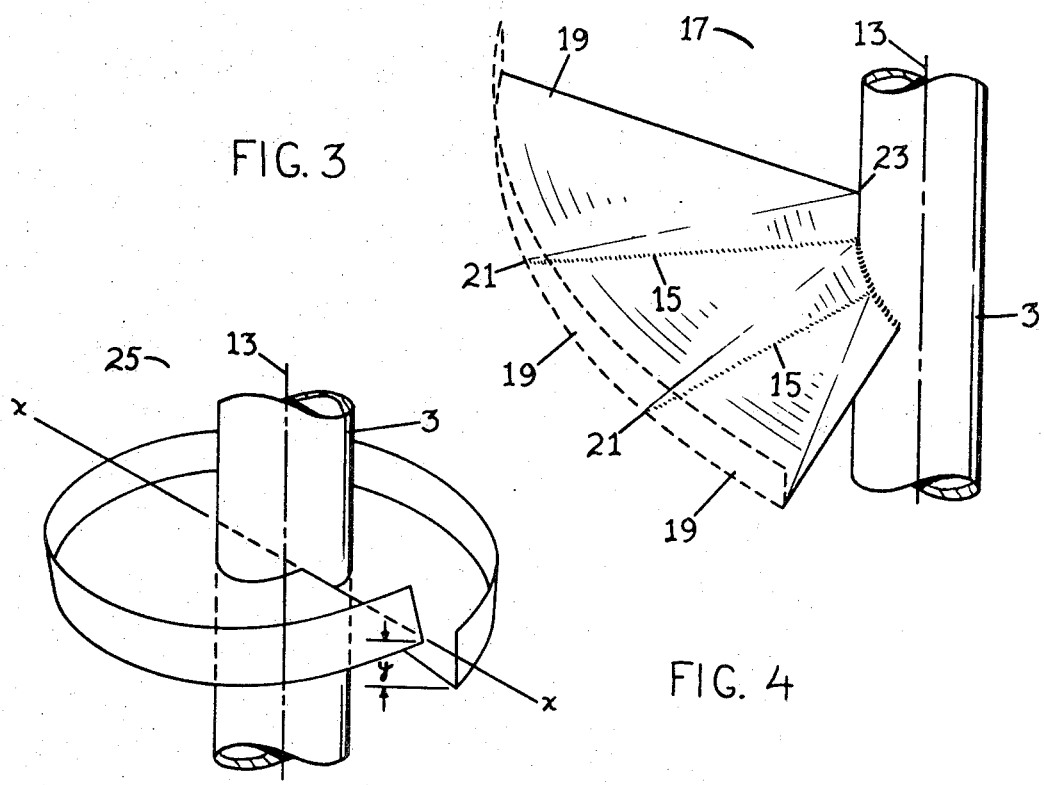
FIG. 3
FIG. 4
INVENTOR.
DONALD M. WINCHESTER
BY George Galvestein
ATTORNEY

PATENTED FEB 16 1971

INVENTOR.
DONALD M. WINCHESTER
BY
George Gabertein
ATTORNEY

SPIRAL CHUTE

This application is a division of Ser. No. 520,615, filed Jan. 14, 1966, now abandoned.

This invention relates to means for the transfer of objects or personnel from one level to another. In particular, it relates to spiral chutes and introduces a new and novel configuration of spiral chutes, and a new and novel process with which to manufacture spiral chutes and components thereof.

Spiral chutes have found application in manufacturing and distributing facilities that require the vertical displacement of an article within a limited area, the convolutions of such a chute providing the advantage of a gradual descent capability within limited space. However, those chutes manufactured to date have incorporated deficiencies inherent to the known and practiced methods of manufacture, several of the more widely practiced of such identifiable as the 'roll and weld,' 'brake' and 'cakepan' methods. The deficiencies of these methods of manufacturing spiral chutes, as will be hereinafter shown, include the need for a large number of parts, high manufacturing and tooling costs, a lack of continuity and smoothness to the sliding surface along which the transferring object or personnel are to descent, and the presence of fatigue susceptible and contaminable seams. Other deficiencies of the prior art and their correction by the present invention will become evident from the appended drawings and the descriptive matter hereinafter set forth.

Accordingly, it is an object of the present invention to provide an improved method of manufacturing spiral chutes.

Another object is to provide an improved configuration of a spiral chute.

It is also an object to provide a spiral chute with minimal distortion and buckling of the sliding surface.

It is an object to provide a method of fabricating spiral chutes from flat sheets that does not entail twisting of the sheets.

It is an additional object to provide a spiral chute fabricated from a small number of parts with reduced fabrication and tooling costs.

Another object is to provide a spiral chute with a minimal number of seams or welds in the path of the sliding object and with reduced vulnerability to contamination.

Referring to the accompanying drawings:

FIG. 2 is view in perspective of a portion of a spiral chute manufactured by the 'roll and weld' method of manufacture;

FIG. 3 is a view in perspective of a portion of a spiral chute manufactured by the 'brake' method of manufacture;

FIG. 4 is a view in perspective of one section of a spiral chute employing the 'cakepan' method;

Figure 1:
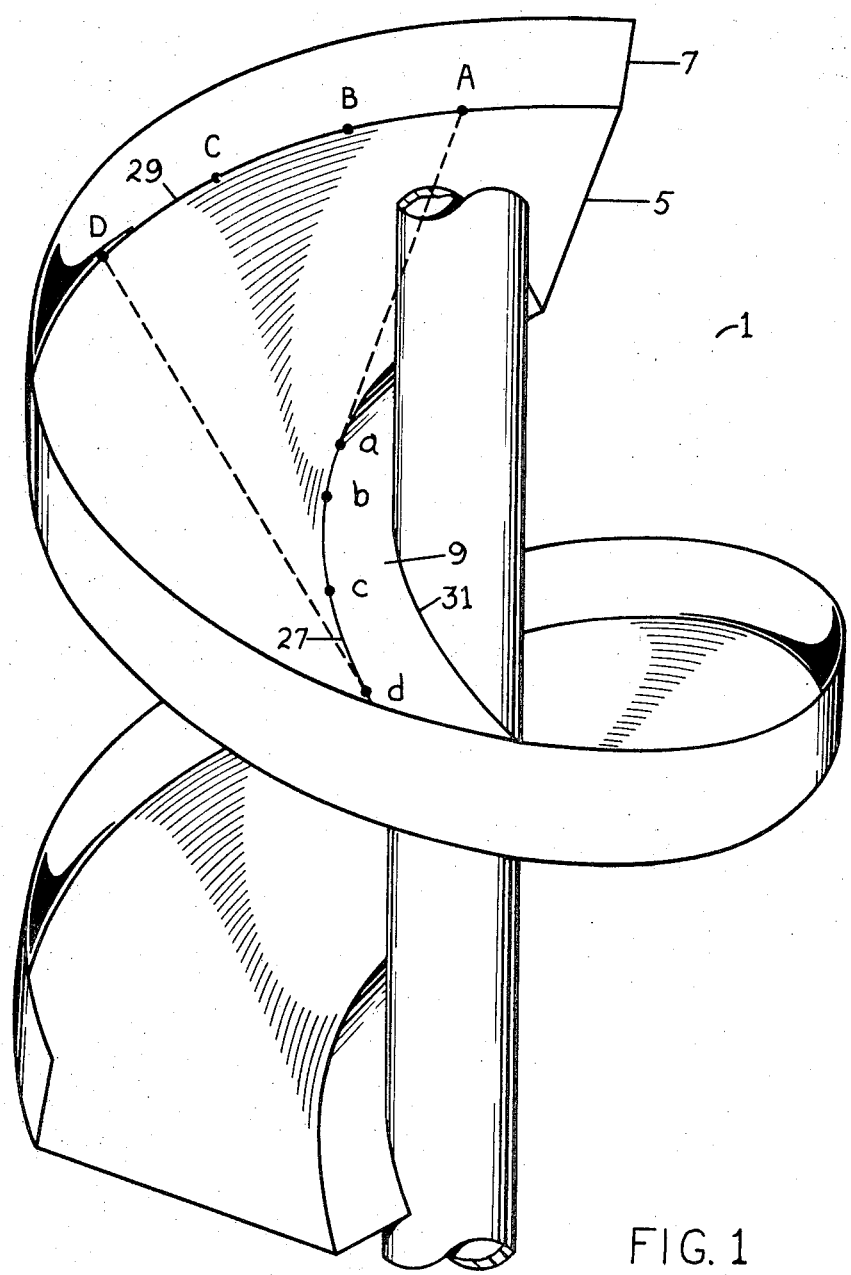
FIG. 1 is a view in perspective of part of spiral chute manufactured in accord with the present invention.

Referring to FIG. 1, the spiral chute 1 comprises a center pole 3, slide 5, inner wall 9 and outer wall 7. The center pole 3, with axis 13, extends vertically as shown and is supported at its top and bottom. The supports can be provided in any of numerous ways and are not an essential part of this invention.

It is easily appreciated that, for the same angular displacement around axis 13, a point on the inner edge 27 of the slide 5 must descend the same vertical distance as a point on the outer edge 29 of the slide but will travel a lesser total distance (being further away from the axis 13 or center of rotation) in its descent. Thus, as the inner edge 27 of the slide descends at a greater rate than the outer edge 29, it can be appreciated that a flat sheet, when made to conform to the shape of the slide, that is with differing rates of descent of its two edges, will tend to twist and buckle. For this reason prior art spiral chutes have been manufactured in accord with the aforementioned 'roll and weld,' 'brake' or 'cakepan' methods which have attempted to minimize or compensate for the hitherto unavoidable twisting and buckling.

Referring to FIG. 2, in the 'roll and weld' method, the flat sheet shape of the slide 11 is determined by conventional triangulation procedures and then cut out and sectioned into relatively short sections 33 along lines that may be considered as extending generally radially outward from the center pole 3. The sections are then rolled and twisted in an attempt to conform them to the differential rate of pitch required between the outer and inner edges and are placed in a jig or fixture to retain them more accurately at the desired twist, for which purpose the sections usually require somewhat more or less twist than has been imparted to them during the rolling process. In the jig, the sections are tacked and welded together. The required twisting introduces built-in undulations and relatively unpredictable variations along the surface of the slide and the many required welds 15 further distort the sections and offer numerous humps and ridges in the path of travel of an object descending the chute. In addition, as the butting edges of the sections are not straight, it is difficult to align them accurately, the result being that the welds are usually of larger than desirable size to compensate for the misalignment of the butting edges.

In the 'brake' method, illustrated in FIG. 3, the sheets intended to form the slide 17 are cut into pie-shaped sections 19. Each section is braked, or bent, along an effectively diagonal line running from the lower corner 21 of the outside edge to the upper corner 23 of the inside edge, thus causing the inner edge to drop more rapidly than the outer edge (which is required for the spiral chute as previously noted). The sections are then assembled in a jig or fixture and they are welded together along lines 15. Alternatively, it is possible to eliminate many of the welds with this method by providing a large sheet with a series of bends. While this will, of course, satisfy objections to the excessive number of welds in the path of the sliding object, the resulting chute will nevertheless have a relatively discontinuous sliding surface composed of numerous abrupt and distinct bends and changes of planes.

The 'cakepan' method consists of using multiple parts, each originally stamped or formed into the shape of a cakepan 25 (FIG. 4), which is then severed radially along line x-x. The two severed ends are then separated from each other shown a distance 'y,' thus twisting the cakepan into a spiral or helical configuration of 360° wraparound. However, the required twisting of the metal imposes a strict limitation to the allowable pitch of the chute. By pitch is meant the distance, measured along the axis of the center pole, that a point on the slide descends as it circumscribes 360°. Stated another way, the severed ends of the cakepan 25 cannot be separated by any substantial distance 'y,' or the material will buckle intolerably, and perhaps rupture. Consequently, if a large vertical displacement is required of the chute, this method requires the use of many dishpan sections which must then be welded together. In addition, a low pitch can preclude the application of the chute to those situations where a strong, net gravitational pull on the transferring object is necessary or desired.

Thus, multiple parts, low pitch, high costs, twisting of the metal causing lack of smoothness and buckling with excessive undulations or distortions, and numerous weldments in the path of the transferring object producing excessive vulnerability to contamination (which is especially important when foodstuff is the transferring object) are all prime disadvantages of existing and known methods of spiral chute construction. These disadvantages are overcome or significantly minimized by the present invention.

The contour or shape of a slide in the flat sheet is determined by the procedure known in the trade as triangulation. This consists of determination on a flat sheet of the relative location of a number of points on the inner edge 27 and the outer edge 29 of the slide 5 (FIG. 1) as derived from the desired chute dimensions.

It is beneficial in the practice of the present invention, although not essential, to triangulate in a manner distinct from conventional practice and consonant with the invention as hereinafter shown.

Figure 5:
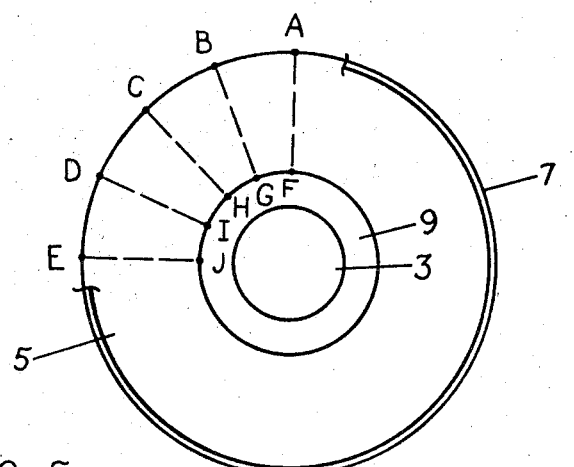
FIG. 5 is a plan view of a spiral chute illustrating a conventional manner of establishing points on the inner and outer edges of the slide for purposes of triangulation.

FIG. 5 is a plan view of 180° wraparound of the spiral chute 5 of FIG. 1. The letters A to E are points on the outer edge 29 of the slide 5 and the letters F to J are points on the inner edge 27. Conventional methods of triangulation would establish radial line A–F as a starting line on the flat sheet, (the true distance between A and F easily determinable by triangulating on the basis of the desired slide dimensions, including angle of inclination of the slide toward the center pole and its inner and outer diameters) and the relative locations of the terminal points of lines B–G, C–H, D–I and E–J are then developed.

Figure 6:
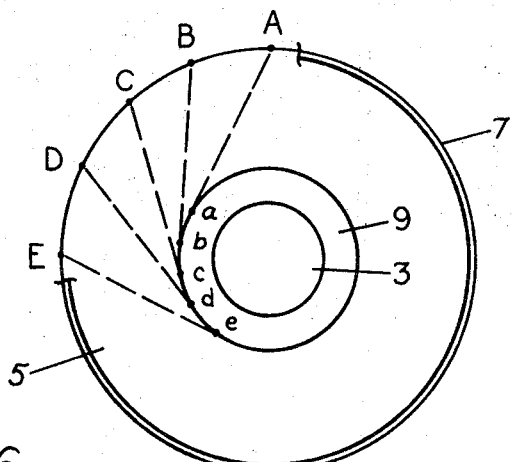
FIG. 6 is a plan view of a spiral chute illustrating a manner in accord with the invention of establishing points on the inner and outer edges of the slide for purposes of triangulation.

It has been found more desirable to triangulate on the basis illustrated in FIG. 6, which is also a plan view of the spiral chute of FIG. 1. Referring thereto, the line $a$–A is established as the starting line, (this line being tangent to the inner edge 27 of the slide 5 as opposed to the radially disposed line A–F of FIG. 5) and the relative locations of the terminal points of the similarly tangential lines $b$–B, $c$–C, $d$–D and $e$–E are established.

The flat shape of slide 5 is then cut out and passed through a slip roller so that lines $a$–A, $b$–B, $c$–C, $d$–D and all lines tangent to the inner edge of slide 5, are substantially parallel to the rollers. In this way, the continuous bend imparted to the sheet by the roller proceeds around the scribed lines and all lines tangent to the inner edge 27, scribed or imaginary. This requires manipulation of the sheet as it passes through the roller so that the longer outer edge 29 is moved through more rapidly than the shorter inner edge 27. Although the sheet can, of course, be rolled in this manner without the visual aid of lines $a$–A, $b$–B, etc. it has been found advantageous to scribe these lines on the flat sheet during the triangulation process so that they can be used as reference lines during the rolling.

To complete the spiral chute depicted in FIG. 1 requires fabrication of the inner wall 9 and outer wall 7, and their assembly with the slide 5 and the center pole 3. The inner wall is fabricated similarly to the slide 5 except that in this case the tangential lines are scribed tangent to the circle representing the inner edge of the inner wall 9, which is equal to the diameter of the center pole 3. The outer wall is a strip cut to the height desired and assembly of the chute is then accomplished by seam welding the inner wall 9 to the center pole 3, the slide 5 to the inner wall 27, and the outer wall 7 to the slide 5 along edges 31, 27 and 29 respectively.

The process permits the manufacture of a slide from a minimal number of parts with butting edges that can be accurately matched with no twisting so as to permit small, unobtrusive weldments connecting the sections. The manner in which this is achieved is by cutting each of the sections, which can be of 360° wraparound, along one of the scribed tangential lines, for example along $d$–D of FIG. 1. As each section of the slide has been rolled along lines tangent to the inner edge, these lines are straight and can be easily matched and butt welded.

Figure 7:
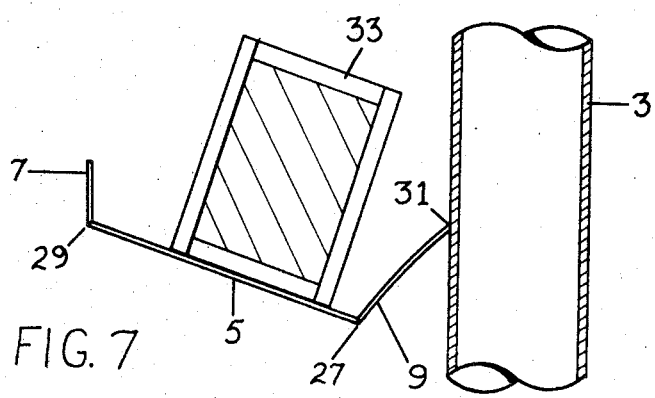
FIG. 7 is a sectional view taken through and parallel to the vertical axis of the chute of FIG. 1.

A particular advantage is to be gained from the use of the inner wall 9 which, as seen in FIG. 1, is interposed between the slide 5 and the center pole 3 and then inclined with respect to the slide 5 to form a sort of V-section therewith as shown in FIG. 7 which is taken in a plane parallel to and through axis 13 of center pole 3. Preferably, the slide 5 is inclined downwardly toward the center pole 3 to offset the effect of the outward thrust of centrifugal force on the sliding object as it slides down the chute. Without such inclination the objects will tend to hug the outer wall 7 and cause excessive wear on the outer portion of the slide. Inclination of the slide alleviates this difficulty but the upper, inside corner of the sliding object 33 is, by virtue of the inclination, directed toward the center pole 3. If the slide directly adjoins the center pole, as in the common practice, the object may then tend to strike or catch on the center pole, thus impeding its movement. The inner wall 9 prevents this by causing the object to maintain, at its lower end, a minimal distance from the center pole 3.

It is to be understood that changes and modifications to the preferred embodiment illustrated and described herein can be made without departing from the spirit of the invention or the scope of the appended claims.

I claim:

1. A spiral chute comprising:
   a. a central, supporting structure;
   b. a slide in helical relation to the axis of said supporting structure;
   c. an inner wall in helical relation to the axis of said supporting structure;
   d. the inner edge of said slide connected to the outer edge of said inner wall whereby in a plane parallel to an intersecting the axis of said supporting structure, the inner edge of said slide is lower than the outer edge of said slide, and the outer edge of said inner wall is lower than the inner edge of said inner wall; and
   e. said slide having a surface comprising straight lines tangent to the curve of the inner edge of said slide.

2. A spiral chute comprising:
   a. a central, supporting structure;
   b. a slide in helical relation to the axis of said supporting structure;
   c. an inner wall in helical relation to the axis of said supporting structure;
   d. the inner edge of said slide connected to the outer edge of said inner wall whereby in a plane parallel to and intersecting the axis of said supporting structure, the inner edge of said slide is lower than the outer edge of said slide, and the outer edge of said inner wall is lower than the inner edge of said inner wall;
   e. an outer wall attached at its inner edge to the outer edge of said slide whereby in a plane parallel to and intersecting the axis of said supporting structure, the outer edge of said outer wall is higher than the inner edge of said outer wall; and
   f. the attachment between said inner wall and said slide, and the attachment between said outer wall and said slide each forming an angle of at least 90° substantially along its length.